United States Patent
Zhu et al.

(10) Patent No.: US 8,781,490 B2
(45) Date of Patent: Jul. 15, 2014

(54) CONTROL CHANNEL INTERFERENCE MITIGATION

(75) Inventors: Yuan Zhu, Beijing (CN); Qinghua Li, San Ramon, CA (US); Shilpa Talwar, Los Altos, CA (US); Nageen Himayat, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 482 days.

(21) Appl. No.: 12/971,701

(22) Filed: Dec. 17, 2010

(65) Prior Publication Data
US 2011/0269493 A1 Nov. 3, 2011

Related U.S. Application Data

(60) Provisional application No. 61/330,837, filed on May 3, 2010.

(51) Int. Cl.
| | |
|---|---|
| H04B 7/00 | (2006.01) |
| H04W 72/00 | (2009.01) |
| H04W 28/12 | (2009.01) |
| H04L 12/56 | (2006.01) |
| H04L 5/00 | (2006.01) |
| H04W 72/04 | (2009.01) |
| H04W 36/22 | (2009.01) |

(52) U.S. Cl.
CPC ............ *H04W 72/042* (2013.01); *H04W 28/12* (2013.01); *H04L 47/283* (2013.01); *H04L 5/001* (2013.01); *H04L 5/0032* (2013.01); *H04L 47/14* (2013.01); *H04L 5/0053* (2013.01); *H04L 47/11* (2013.01); *H04W 72/0406* (2013.01); *H04L 5/0094* (2013.01); *H04L 5/003* (2013.01); *H04W 36/22* (2013.01); *H04W 72/0486* (2013.01); *H04L 5/0064* (2013.01); *H04L 47/30* (2013.01)

USPC ........ 455/452.2; 455/452.1; 455/68; 455/509

(58) Field of Classification Search
USPC ........ 455/450, 452.1, 452.2, 464, 509, 422.1, 455/434, 68, 67.11, 67.13; 370/347, 329, 370/242
See application file for complete search history.

(56) References Cited

U.S. PATENT DOCUMENTS

| 6,189,033 B1 | 2/2001 | Jin et al. |
|---|---|---|
| 6,463,047 B1 | 10/2002 | Cui et al. |
| 6,816,500 B1 | 11/2004 | Mannette et al. |

(Continued)

FOREIGN PATENT DOCUMENTS

| CN | 1852041 A | 10/2006 |
|---|---|---|
| CN | 101389106 A | 3/2009 |

(Continued)

OTHER PUBLICATIONS

"U.S. Appl. No. 12/976,217 , Response filed Dec. 17, 2012 to Non Final Office Action mailed Sep. 26, 2012", 15 pgs.

(Continued)

*Primary Examiner* — John J Lee
(74) *Attorney, Agent, or Firm* — Schwegman, Lundberg & Woessner, P.A.

(57) ABSTRACT

In some embodiments, control channel data is passed between neighboring base stations to allocate control channel resources to mitigate inter-cell interference.

17 Claims, 5 Drawing Sheets

(56) References Cited

U.S. PATENT DOCUMENTS

| | | | |
|---|---|---|---|
| 7,327,681 B2 | | 2/2008 | Rhee et al. |
| 8,050,226 B2 * | | 11/2011 | Park et al. .................. 370/329 |
| 8,532,030 B2 | | 9/2013 | Koc et al. |
| 2007/0110103 A1 | | 5/2007 | Zimmerman et al. |
| 2008/0212591 A1 | | 9/2008 | Wu et al. |
| 2009/0067428 A1 | | 3/2009 | Balandin et al. |
| 2009/0181690 A1 | | 7/2009 | McCoy et al. |
| 2009/0215451 A1 * | | 8/2009 | Lim et al. .................. 455/434 |
| 2009/0238135 A1 | | 9/2009 | De et al. |
| 2009/0271512 A1 | | 10/2009 | Jorgensen |
| 2010/0008248 A1 | | 1/2010 | Constantine et al. |
| 2010/0008317 A1 | | 1/2010 | Bhattad et al. |
| 2011/0249579 A1 * | | 10/2011 | Hu et al. .................. 370/252 |
| 2011/0268052 A1 | | 11/2011 | Koc et al. |
| 2011/0274059 A1 * | | 11/2011 | Brown et al. .............. 370/329 |
| 2012/0250523 A1 * | | 10/2012 | Miki .......................... 370/242 |

FOREIGN PATENT DOCUMENTS

| | | |
|---|---|---|
| CN | 101594215 A | 12/2009 |
| CN | 102948205 A | 2/2013 |
| EP | 1750409 A1 | 2/2007 |
| JP | 2008300989 A | 12/2008 |
| KR | 1020090013568 A | 2/2009 |
| WO | WO-2009037854 A1 | 3/2009 |
| WO | WO-2010025242 A2 | 3/2010 |
| WO | WO-2011043192 A1 | 4/2011 |
| WO | WO-2011139462 A2 | 11/2011 |
| WO | WO-2011139462 A3 | 11/2011 |

OTHER PUBLICATIONS

"U.S. Appl. No. 12/976,217, Final Office Action mailed Mar. 14, 2013", 11 pgs.

"U.S. Appl. No. 12/976,217, Non Final Office Action mailed Sep. 26, 2012", 14 pgs.

"U.S. Appl. No. 12/976,217, Notice of Allowability mailed Jun. 12, 2013", 2 pgs.

"U.S. Appl. No. 12/976,217, Notice of Allowance mailed May 10, 2013", 6 pgs.

"U.S. Appl. No. 12/976,217, Preliminary Amendment filed Mar. 1, 2011", 7 pgs.

"U.S. Appl. No. 12/976,217, Response filed Apr. 24, 2013 to Final Office Action mailed Mar. 14, 2013", 12 pgs.

"U.S. Appl. No. 12/976,217, Response filed Dec. 17, 2012 to Non Final Office Action mailed Sep. 26, 2012", 12 pgs.

"European Application Serial No. 11163386.3, Office Action mailed May 19, 2011", 2 pgs.

"European Application Serial No. 11163386.3, Response filed Jul. 13, 2011 to Office Action mailed May 19, 2011", 1 pg.

"International Application Serial No. PCT/US2011/031200, International Preliminary Report on Patentability mailed Nov. 15, 2012", 6 pgs.

"International Application Serial No. PCT/US2011/031200, International Search Report mailed Nov. 25, 2011", 3 pgs.

"International Application Serial No. PCT/US2011/031200, Written Opinion mailed Nov. 25, 2011", 4 pgs.

"Japanese Application Serial No. 2011-088841, Office Action mailed Sep. 18, 2012", With English Translation, 5 pgs.

"Japanese Application Serial No. 2011-088841, Response filed Dec. 18, 2012 to Office Action mailed Sep. 18, 2012", 18 pgs.

"Part 16: Air Interface for Broadband Wireless Access Systems", Sections 16.2.3.47.1: AAI-DSA-REQ-16.2.3.47.3: AAI-DSA-ACK, IEEE P802.16m/D9, (Oct. 6, 2010), 219-240.

"Part 16: Air Interface for Broadband Wireless Access Systems", Sections 6.3.2.3.10 DSA-REQ message-6.3.2.3.11 DSA-RSP message, IEEE 802.16-2009, (May 2009), 120-122.

"Chinese Application Serial No. 201110111383.6, Office Action mailed May 22, 2013", 12 pgs.

"Chinese Application Serial No. 201110111383.6, Office Action mailed Dec. 20, 2013", 10 pgs.

"European Application Serial No. 11163386.3, Extended European Search Report mailed Dec. 20, 2013", 6 pgs.

U.S. Appl. No. 12/976,217, filed Dec. 22, 2010, Techniques for Initiating Communication in a Wireless Network.

\* cited by examiner

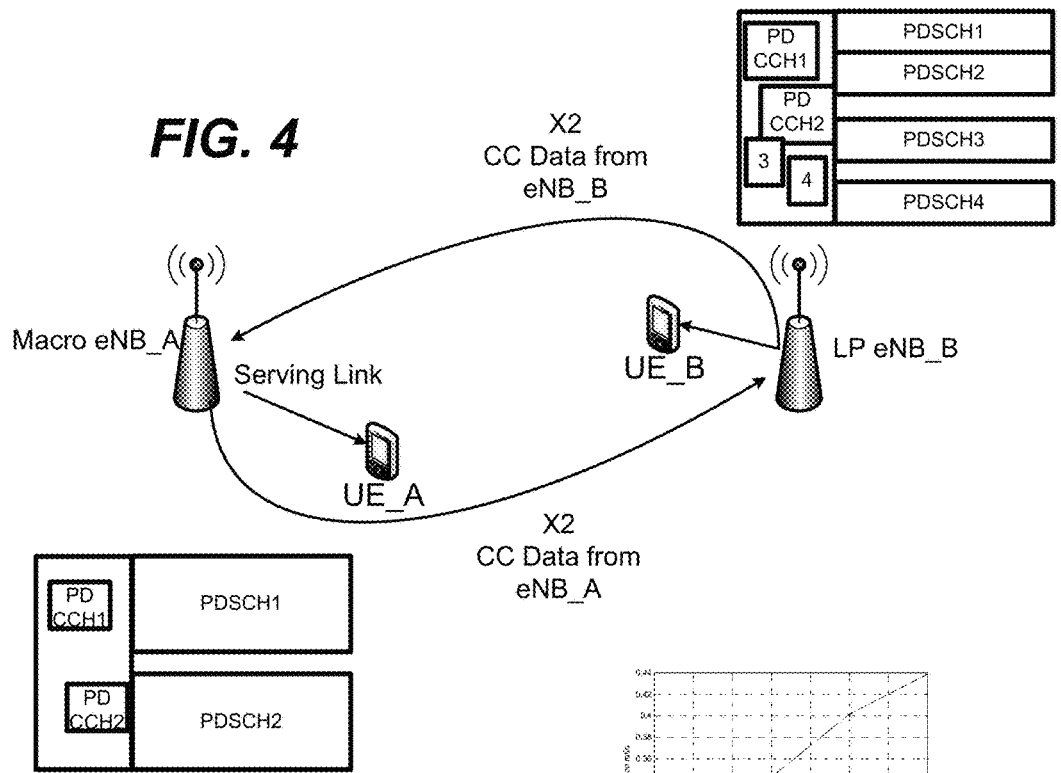
FIG. 4
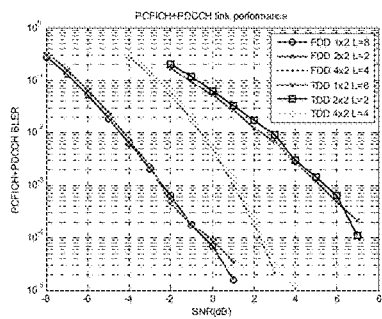
FIG. 5
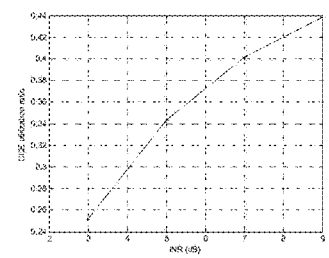
FIG. 6
CCE Data Over X2
(from eNB_A)
L=8: 20%, BLER=1%
L=4: 30%, BLER=1%
L=2: 40%, BLER=1%
L=1: 10%, BLER=1%
CCE Utilization: 20%
CCE Data Over X2
(from eNB_B)
L=8: 60%, BLER=10%
L=4: 30%, BLER=1%
L=2: 5%, BLER=1%
L=1: 5%, BLER=1%
CCE Utilization: 80%
FIG. 7

CONTROL CHANNEL INTERFERENCE MITIGATION

This application claims the benefit of and priority to US Provisional Patent Application No. 61/330,837, filed May 3, 2010, which is incorporated by reference herein.

TECHNICAL FIELD

The present invention relates generally to wireless devices and systems, and in particular, to devices, methods, and systems for mitigating inter-cell interference.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 4 illustrates control channel interference mitigation techniques for the network of FIG. 1 in accordance with some embodiments.

FIG. 5 illustrates graphs showing control channel interference (correlated with block error rate) versus control channel SNR for different control channel aggregation and physical link configurations in accordance with some embodiments.

FIG. 6 is a graph showing CCE utilization level versus INR in accordance with some embodiments.

FIG. 7 shows control channel coordination data for coordinating control channel utilization for mitigating control channel interference between first and second cells in accordance with some embodiments.

DETAILED DESCRIPTION

Embodiments of the present invention may help facilitate improved performance for high throughput, mobile wireless networks, e.g., 3GPP Long Term Evolution (LTE) and beyond.

Figure 1:
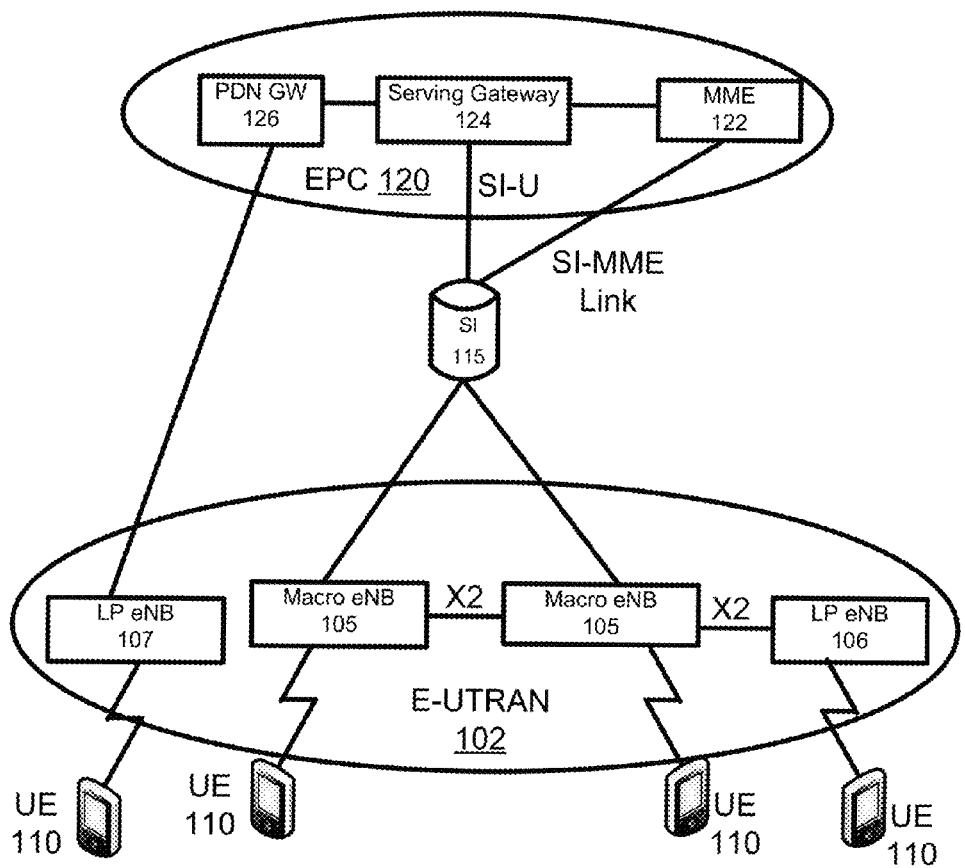
FIG. 1 is a diagram of a portion of an LTE network architecture in accordance with some embodiments.

FIG. 1 shows a portion of an end-to-end network architecture of LTE (long term evolution) network with various components of the network. The network comprises a radio access network (e.g., as depicted, the E-UTRAN or evolved universal terrestrial radio access network) 102 and the core network (EPC) 120 coupled together through an S1 interface 115. (Note that for convenience and brevity sake, only a portion of the core network, as well as the RAN, is shown. also note that both the EPC and E-UTRAN have been defined as new components of the end-to-end network in Release 8 of the 3GPP specifications, but the invention is not limited to these particular versions.)

The core (EPC) 120 includes mobility management entity (MME) 122, serving gateway (serving GW) 124, and packet data network gateway (PDN GW) 126. The RAN 102 includes macro base stations (also referred to as macro eNodeB or eNB) 105, low power (LP) base stations (or LP eNBs) 106, 107, and UEs (user equipment or mobile terminals) 110.

The MME is similar in function to the control plane of legacy Serving GPRS Support Nodes (SGSN). It manages mobility aspects in access such as gateway selection and tracking area list management. The serving GW 124 terminates the interface toward the RAN, and routes data packets between the RAN and core network. In addition, it may be a local mobility anchor point for inter-eNode-B handovers and also may provide an anchor for inter-3GPP mobility. Other responsibilities may include lawful intercept, charging, and some policy enforcement. The Serving GW and the MME may be implemented in one physical node or separate physical nodes. The PDN GW terminates an SGi interface toward the packet data network (PDN). It routes data packets between the EPC and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW and the Serving GW may be implemented in one physical node or separated physical nodes.

The eNode-B (macro and micro) terminates the air interface protocol and is usually (if not always) the first point of contact for a UE. In some embodiments, an eNode-B may fulfill various logical functions for the RAN including but not limited to RNC (radio network controller functions) such as radio bearer management, uplink and downlink dynamic radio resource management and data packet scheduling, and mobility management.

The S1 interface is the interface that separates the RAN and the EPC. It is split into two parts: the S1-U, which carries traffic data between the eNode-B and the Serving GW, and the S1-MME, which is a signaling interface between the eNode-B and the MME. The X2 interface is the interface between eNode-Bs (at least between most, as will be addressed below regarding micro eNBs). The X2 interface comprises two parts, the X2-C and X2-U. The X2-C is the control plane interface between eNode-Bs, while the X2-U is the user plane interface between eNode-Bs.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNode-B for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, LP eNB 107 might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB 106 could be implemented with a picocell eNB since it is coupled to a macro eNB via an X2 interface. Picocell eNBs Or other LP eNBs for that mater) may incorporate some or all functionality of a macro eNB. In some cases, this may be referred to as an access point base station or enterprise femtocell.

Figure 2:
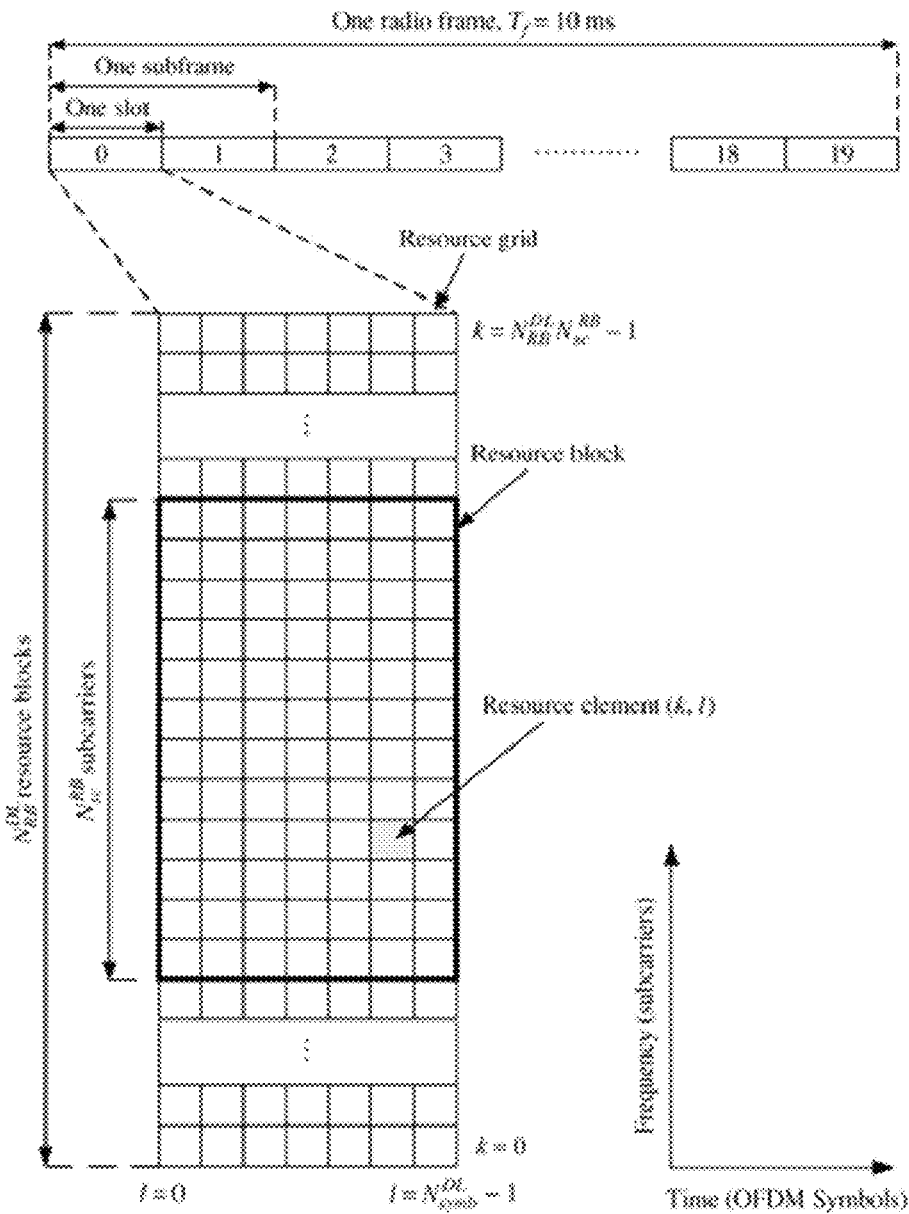
FIG. 2 is a diagram showing the structure of a downlink resource grid for the network of FIG. 1 in accordance with some embodiments.

FIG. 2 shows a structure for the downlink resource grid for downlink transmissions from an eNB to a UE. The depicted grid illustrates a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE. The physical downlink control channel (PDCCH) carries information about the transport format and resource allocations related to the PDSCH channel, among other things. It also informs the UE about the transport format, resource allocation, and H-ARQ information related to the uplink shared channel. Typically, downlink scheduling (assigning control and shared channel resource blocks to UEs within a cell) is performed at the eB based on channel quality information fed back from the UEs to the eNB, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There are currently four different PDCCH formats defined in LTE with different numbers of CCEs (e.g., aggregation level, L, =1, 2, 4, or 8).

Unfortunately, inter-cell interference occurs for neighboring cells, affecting each others overlapping channels. This is becoming especially problematic with added eNB density ever-increasing as a result of the increasing use of LP eNBs such as with femtocells and picocells. For the physical downlink shared channel, much effort has already been endeavored in devising schemes to mitigate against inter-cell interference, but little less been done for the downlink control channel, although a number of methods have been proposed.

Figure 3A:
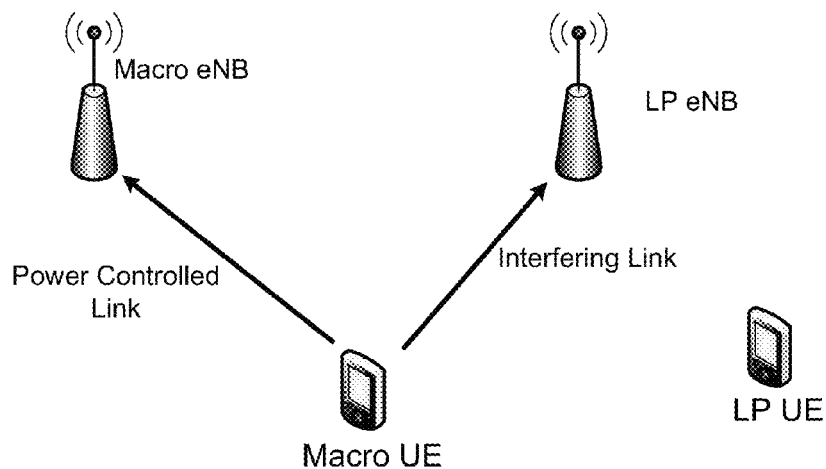
FIGS. 3A-3D illustrate prior art ICIC mitigation approaches.
Figure 3B:
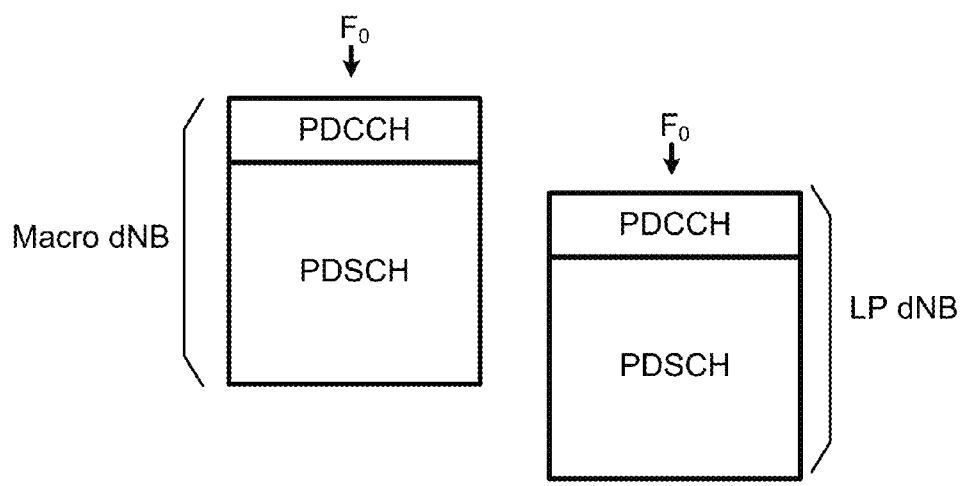

For example, with reference to FIG. 3B, symbol shifting between a macro eNB and LP eNB may be implemented. The resource blocks are made so that the control part of the macro eNB collides with the data part of the LP eNB and vice versa. If the macro eNB is lightly loaded, this approach can effectively mitigate the inter-cell interference for the LP UE because some of the resource blocks for the data part are not transmitted. But if the macro eNB is fully loaded, symbol shifting may not be able to mitigate the interference for an LP UE. Another problem is that global synchronization may also be needed for this method. Another drawback is that this approach only works with FDD (frequency division duplexing, for the uplink), which prohibits TDD (time division duplexing) implementations when global frame synchronization is needed.

Figure 3C:
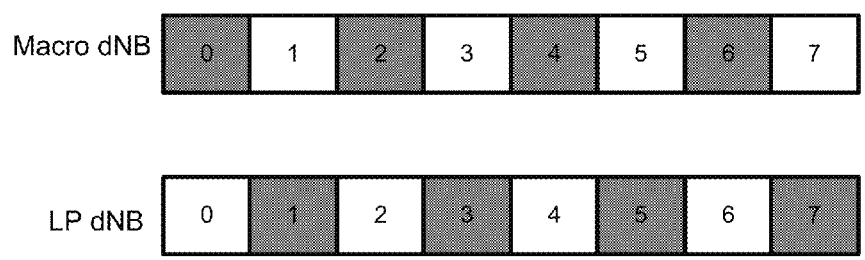

Another approach, as depicted in FIG. 3C, is to use 50% resource splitting between pertinent macro and LP eNBs. The basic idea is to extend Release 8 ICIC mitigation for the shared channel for time domain with sub-frame granularity to mitigate the inter-cell interference for the control channel. The resources for macro and LP eNBs can be partially overlapped as with fractional frequency reuse schemes. Unfortunately, there are also drawbacks with this scheme. For example, CQI (channel quality indicator) reporting delay may be increased because the time delay between two sub-frames experiencing similar interference is increased. This delay increase will be more obvious in cases where the number of sub-frame types experiencing different interference situation is high, e.g. in partially overlapping scenarios. In addition, this solution is not TDD friendly because of fixed and frame specific HARQ timing in TDD frames.

Figure 3D:
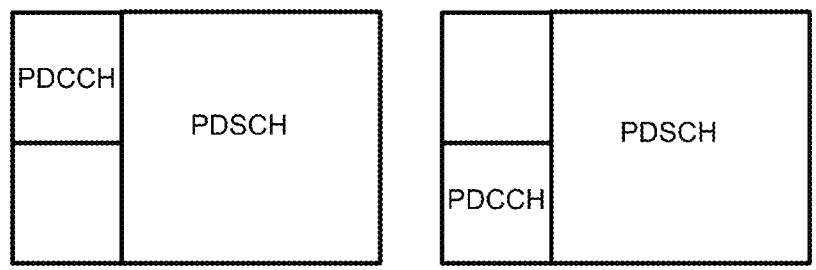

With reference to FIG. 3D, another existing approach involves creating frequency domain orthogonality for PDCCH channels among macro and LP eNBs. There are also a couple of drawbacks for this method. There are changes in the air interface that inhibit Release-8 implementations from exploiting the interference mitigation improvements when working with later Release (e.g., Rel.-10) eNBs. Also, if the FDM is physical and the system bandwidth is split in the middle into two parts, it may harm the frequency diversity gain for the PDCCH channel. If the FDM is logical and two regions are interleaved in the frequency domain, then much standardization effort would be needed to design new CCE (control channel element) to REG (resource element group) mapping rules in order to achieve the interleaving.

FIGS. 4 to 7 illustrate aspects of new approaches disclosed herein for control channel inter-cell interference mitigation. In some embodiments, CCE aggregation level distribution and/or CCE (control channel element) utilization can be included in the load description for the PDCCH and communicated between eNBs. In addition, in some embodiments, one or more bits could be used as a PDCCH overload indicator exchanged between eNBs, e.g., over the X2 interface. FIG. 5 generally illustrates how such control channel information could be exchanged between a macro and an LP eNB to reduce interference in the PDCCH.

FIG. 5 is a graph showing control channel interference (correlated with block error rate) versus control channel SNR for different control channel aggregation and physical link configurations in accordance with some embodiments. For example, the first curve (FDD 1X2, L=8) indicates that roughly a −4.5 dB SNR (signal to noise ratio) will result in a 1% BLER. (block error rate). FIG. 6 is a graph showing CCE utilization level versus INR in accordance with some embodiments. Together, such relationships can be used to more efficiently allocate CCE resources between neighboring cells, thereby allowing for additional CCE resources made available to cells with weaker channels and reducing CCEs for cells with stronger channels to enable each cell to have adequate control channel performance.

With interference dominant scenarios, different REGs can experience dramatically different interference+noise power. When the same REG is used by dominant interferers, it may create an effect similar to puncturing. When the same REG is not used by a dominant interferer, the REG may experience instantaneous high SINR. Average SINR improvement from decreasing the PDCCH load can be modeled as:

$$\rho = 10 \cdot \log 10 \left( \frac{1 + INR}{1 + INR \cdot \alpha} \right)$$

where INR is interference to noise ratio and a is PDCCH CCE utilization ratio.

If an X2 interface target eNB knows that a source eNB has 10% BLER, it could calculate a α value to make ρ equal to 3 dB. The a to INR relationship for these examples, as a function of INR, is illustrated in FIG. 6. As an example, if the INR is assumed to be 9 dB, in order to achieve 3 dB gain for source eNBs PDCCH channels, the target eNB would need to control the PDCCH utilization ratio to be 44%.

As another example, FIG. 7 shows possible control channel coordination information passed over an X2 interface between the macro and LP eNBs of FIG. 4 to mitigate control channel interference. The LP eNB (enB_B) is experiencing more severe interference and so it is designated (or allowed) to have 80% CCE utilization, while eNB_A is given only 20% CCE utilization since it requires less CCE aggregation to achieve acceptable BLER.

The example in FIG. 7 can be extended in the time domain, e.g., a value string could be defined for a period of 40 ms and each element within the string could describe the PDCCH load information for, e.g., a 1 ms sub-frame. Thus the PDCCH load for each sub-frame within the period could be configured with a different value to enable, for example, two neighboring eNBs for coordinating scheduling in the time domain to better mitigate the inter-cell interference on each of the sub-frames.

The invention is not limited to the embodiments described, but can be practiced with modification and alteration within the spirit and scope of the appended claims. For example, it should be appreciated that the present invention is applicable for use with all types of mobile devices. Examples include but are not limited to personal computers, cellular phones, so-called smart phones, and the like. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details are set forth in order to describe example embodiments of the invention, it should be apparent to one skilled in the art that the invention can be practiced without, or with variation of, these specific details. The description is thus to be regarded as illustrative instead of limiting.

What is claimed is:

1. A computing device, comprising:
   a processor to:
   receive control channel error information for two or more neighboring base stations to determine relative control channel resource needs for each base station to attain predefined control channel quality, wherein the two or more neighboring base station use a set of control channel elements (CCEs) for their control channels; and
   allocate an amount of the control channel elements of the set to each base station based on the determined relative control channel resource needs,
   wherein the amount of control channel elements allocated to each base station for use as a control channel is less than a total number of the control channel elements of the set, and
   wherein at least some different control channel elements of the set are allocated to each base station.

2. The computing device of claim 1, in which the two or more neighbor base stations comprise a macro eNode-B base station and a low power eNode-B base station.

3. The computing device of claim 2, in which the macro and eNode-B base stations are linked together to communicate control channel data through an X2 interface.

4. The computing device of claim 1, wherein the processor determines a maximum block error rate for user equipment links to determine control channel quality.

5. The computing device of claim 1, in which CCE aggregation level distribution is to be communicated between the base stations.

6. The computing device of claim 1, in which CCE utilization data is communicated between the base stations.

7. The computing device of claim 6, in which one or more bits are to be used as a PDCCH overload indicator exchanged between the base stations over an X2 interface.

8. A computing device, comprising:
   a processor to:
   receive control channel error information for two or more neighboring base stations to determine relative control channel resource needs for each base station to attain predefined control channel quality; and
   allocate the determined control channel resources to control-channels between the two or more base stations to meet the predefined control channel quality,
   wherein the processor determines a maximum block error rate for user equipment links to determine control channel quality and evaluates a known relationship between control channel quality and the block error rate to meet the predefined control channel quality.

9. An apparatus, comprising:
   processing circuitry coupled to an active LTE base station that has neighboring LTE base stations, the processing circuitry arranged to receive control channel information from the active base station, the active base station and neighboring base stations to communicate control channel parameters between each other to determine relative control channel resource needs for each base station to attain predefined control channel quality to allocate control channel resources to meet the predefined control channel quality for the base stations,
   wherein the base station use a set of control channel elements (CCEs) for their control channels and the processing circuitry is arranged to allocate an amount of the control channel elements of the set to each base station based on the determined relative control channel resource needs,
   wherein the amount of control channel elements allocated to each base station for use as a control channel is less than a total number of the control channel elements of the set, and
   wherein at least some different control channel elements of the set are allocated to each base station.

10. The apparatus of claim 9, in which the base stations comprise a macro eNode-B base station and a low power eNode-B base station.

11. The apparatus of claim 10, in which the macro and eNode-B base stations are linked together to communicate control channel data through an X2 interface.

12. The apparatus of claim 10, wherein a maximum block error rate is determined to identify control-channel quality.

13. The apparatus of claim 10, in which CCE aggregation level distribution is to be communicated between the base stations.

14. The apparatus of claim 10, in which CCE utilization data is communicated between the base stations.

15. The apparatus of claim 14, in which one or more bits are to be used as a PDCCH overload indicator exchanged between the base stations over an X2 interface.

16. The apparatus of claim 9, in which resources are allocated in the time domain between the active and neighboring base stations.

17. An apparatus, comprising:
a portable wireless device to be wirelessly coupled to an active LTE base station that has neighboring LTE base stations, the wireless device to receive control channel information from the active base station, the active base station and neighboring base stations to communicate control channel parameters between each other to determine relative control channel resource needs for each base station to attain predefined control channel quality to allocate control channel resources to meet the predefined control channel quality for the base stations, in which the base stations comprise a macro eNode-B base station and a low power eNode-B base station,
wherein a maximum block error rate is determined to identify control-channel quality and a known relationship between control channel quality and the block error rate is evaluated to meet the predefined control channel quality.

* * * * *